United States Patent [19]

McIntyre-Major

[11] Patent Number: 5,227,176
[45] Date of Patent: Jul. 13, 1993

[54] MOLD FOR A SHAPED LAMINATE

[75] Inventor: Susan E. McIntyre-Major, Springfield, Mass.

[73] Assignee: Monsanto Company, St. Louis, Mo.

[21] Appl. No.: 803,933

[22] Filed: Dec. 6, 1991

[51] Int. Cl.$^5$ ............................................... B29C 33/42
[52] U.S. Cl. ......................... 425/387.1; 156/212; 249/65; 249/82; 425/503; 425/DIG. 14; 425/DIG. 112
[58] Field of Search ............... 425/387.1, 440, 503, 425/DIG. 14, DIG. 112, 389, 517; 249/65, 82, 183, 139; 156/212; 65/305; 264/252

[56] References Cited

U.S. PATENT DOCUMENTS

| | | | |
|---|---|---|---|
| 3,004,295 | 10/1971 | Bottoms et al. | 264/510 |
| 3,238,576 | 3/1966 | Taccone | 249/183 X |
| 3,530,208 | 9/1970 | Rausing | 425/DIG. 14 |
| 4,038,014 | 7/1977 | Dusza et al. | 425/388 |
| 4,421,698 | 12/1983 | Vanderlans | 425/DIG. 14 |
| 4,504,341 | 3/1985 | Radzwill et al. | 156/102 |
| 4,944,822 | 7/1990 | Ishikawa et al. | 156/212 |
| 4,999,147 | 3/1991 | Kojima et al. | 264/139 |
| 5,082,515 | 1/1992 | Cartier et al. | 264/252 X |

Primary Examiner—Richard L. Chiesa
Attorney, Agent, or Firm—Michael J. Murphy; Mark F. Wachter

[57] ABSTRACT

A mold for a shaped laminate having a rigid member which includes a cavity through which plastic layers are drawn in forming the laminate, such cavity comprising a deformable wall portion having a shape-sustaining configuration matching the surface contour of a rigid member of the laminate, such deformable wall portion being reshapable to another shape-sustaining configuration matching the surface contour of an alternative shape of rigid member of a different shaped laminate.

1 Claim, 1 Drawing Sheet

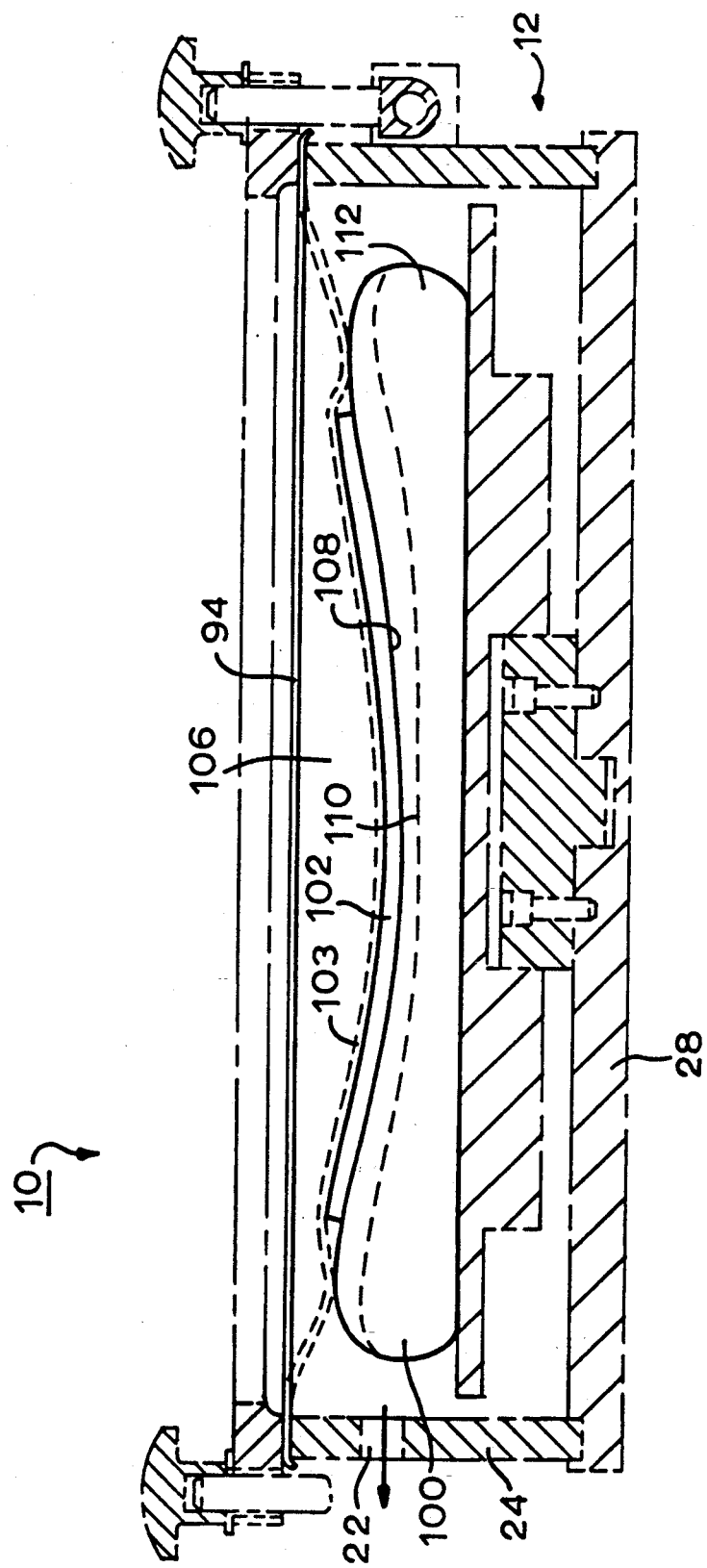

5,227,176

MOLD FOR A SHAPED LAMINATE

BACKGROUND OF THE INVENTION

This invention relates to apparatus for forming a shaped laminate having a rigid member such as a bilayer safety glazing and more particularly to a mold for use in such apparatus.

Commonly assigned, copending, allowed, U.S. application Ser. No. 07/617,734, filed Nov. 26, 1990, entitled "Method Of Forming A Bilayer Glazing Panel", now U.S. Pat. No. 5,082,515 discloses apparatus for forming a bilayer glazing panel, the latter being a shaped laminate which includes at least one rigid member such as a glass or equivalent layer. In brief, according to such application functional planar plastic layers are drawn or stretched against a previously bent glass panel lying in a mold and then the plastic layer abutting the glass is strongly bonded to the glass by increasing the temperature of and pressure on the layered combination to form the shaped laminate. A thermoforming assembly as part of such apparatus is used in the drawing step which includes a stiffly-resilient member (identified as 48 in FIG. 3 of such application) supporting the glass which is meant to resiliently deform under the influence of the elevated pressure to avoid cracking or fracturing the fragile glass. Such member reverts to its unstressed shape when the pressure is released and performs identically during the next forming cycle. A new support member for the glass must be fabricated for each significant variation in curvature of the rigid glass member. It would be desirable to avoid such multiple support members to accommodate differently shaped laminate configurations.

SUMMARY OF THE INVENTION

Now, apparatus improvements have been developed which overcome the aforementioned shortcomings of the prior art.

Accordingly, the object of this invention is to provide a mold for forming a shaped, low profile laminate which includes a rigid member such as glass panel, which can be changed without being replaced to accommodate different configurations of rigid member and therefore of the shaped laminate.

Other objects of this invention will in part be obvious and will in part appear from the following description and claims.

These and other objects are accomplished by providing a mold for a shaped laminate having a rigid member which comprises a cavity through which plastic layers are drawn in forming the laminate, such cavity comprising a deformable wall portion having a shape-sustaining configuration matching the surface contour of a rigid member of the laminate; such deformable wall portion being reshapable to another shape-sustaining configuration matching the surface contour of an alternative shape of rigid member of a different shaped laminate. The preferred form of deformable wall portion is provided by a multitude of freeflowing spherical glass beads partially filling a bag resting on a support surface of the mold.

BRIEF DESCRIPTION OF THE DRAWING

In describing the overall invention, reference will be made to the accompanying drawing which is an elevational view, partly in schematic form, of a thermoforming assembly in which the mold of the invention is usable.

DETAILED DESCRIPTION OF PREFERRED EMBODIMENTS

Referring now to the drawing, thermoforming assembly 10 is illustrated in which mold 12 of the invention is exemplarily usable. Except for member 100 in solid lines to be further described herein, thermoforming assembly 10 in phantom lines is illustrated as 14 in FIGS. 2 and 3 and described in detail in copending, allowed, U.S. application Ser. No. 07/617,734 filed Nov. 26, 1990, the detailed description section of which (pages 4-21) is essential to the disclosure of this application and is therefore incorporated herein by reference. This invention departs from the noted disclosure of the copending application in the structure of member 100.

Mold 12 of thermoforming assembly 10 comprises upstanding rigid side wall 24 fixed to rigid base 28 for forming a shaped laminate having at least one rigid member such as contoured glass layer 102. One form of such a shaped laminate is a bilayer glazing panel usable as a window in a motor vehicle and more particularly described in said copending application. Such a shaped laminate in the drawing comprises, in combination, contiguous plastic layer(s) schematically represented by thickness 103 and glass layer 102. In forming such a shaped laminate, a collection of initially taut, horizontally disposed plastic layers 94 are drawn through mold cavity 106 into surface contact with contoured glass layer 102 previously positioned and resting in supporting engagement throughout the entire extent of its surface on deformable wall portion 108 within mold cavity 106. Deformable wall portion 108 has a shape-sustaining surface configuration matching the surface contour of glass layer 102 of the shaped laminate being formed. Shape-sustaining configuration means that the surface maintains its contour after the shaped part is removed from the mold, as opposed to resiliently reverting to an initial position after part removal from a different stressed position while pressure is being exerted on the part during the laminating interval of the shaping cycle. As described hereafter, deformable wall portion 108 underlying glass layer 102 is reshapable to another shape-sustaining configuration illustratively shown as dotted line 110 in the drawing, which second configuration matches the surface contour of an alternative shape of rigid member of a different shaped laminate. In the illustrated embodiment, deformable wall portion 108 of mold 12 is formed by the surface of a bag 112 partially filled with a free-flowing material in the form of a multitude of spherical glass beads within closed bag 112 and not shown. Depending on the contour of the rigid member, beads may be added or removed from the bag as required. The greater the curvature the fewer the beads required and vice versa. Such partially filled bag 112 loosely rests under its own weight on the surface of support bed 18. Alternatively to the multitude of randomly engaging spherical beads, a very viscous, semi-liquid material can be used (e.g. silicone greases, oils, gels or putties) which is capable of providing the shape-sustaining configuration conforming to the rigid member 102 of the shaped laminate. Yet another embodiment of deformable wall could be provided by low pressure gas (e.g. air) confined within an impermeable bag or bladder. Uncovered sand is also a usable alternative to spherical beads in a bag, but when using sand it must be suitably confined to insure that vacuum port 22 is functional. Also, when the plastic layer abutting glass layer 102 in the shaped laminate is sticky during shaping, e.g. polyvinyl butyral, a suitable protective covering (e.g. polyethylene terephthalate film) peripherally outward of the edge of the glass layer should be placed over the sand to avoid undesirable sticking to the sand. It is, however, necessary that the means defining deformable wall portion 108 be capable of withstanding elevated temperature and pressure on the order of about 150° C. and 1140 kPa when used in forming the preferred bilayer glazing panel form of shaped laminate.

The various steps of the process forming the shaped laminate are described in detail in the section of the previously noted application incorporated herein by reference.

To exploit the versatility of the illustrated mold structure and avoid fabricating a different mold surface configured to match an alternate configuration of glass panel 102 (such as schematically shown in dotted line position 110) it is conveniently only necessary to manually work the alternate glass layer configuration into deformable wall portion 108 to displace the underlying beads and transform wall 108 into the new shape-sustaining configuration of mold surface. The extent of curvature of the shape of rigid member being supported will define the extent to which the bed must be reshaped. Though concave positions of the deformable wall portion are shown, convex can be equally accommodated. Similarly, any shape in plan view can be used. The reconfigured shape of deformable wall portion 108 firmly supports the alternative configuration of glass layer 110 uniformly throughout its surface during the thermoforming-laminating steps of the shaping process. The inventive structure obviates the need to fabricate multiple mold beds conforming to different glass curvatures consequently saving time, space, materials and capital. Flexibility to readily produce a wide array of laminated glazing shapes is provided with minimal investment.

EXAMPLE

A vulcanized rubber form of member 48 illustrated in FIG. 3 of the previously noted copending application was replaced with a cotton (Kendall cloth) bag about 30% filled with 1 mm spherical glass beads from Fischer Scientific (Medford Mass). The bead bag rested on a support plate as shown in the drawing of this application. An 18 by 21 inch (46 by 53 cm) rectangular tempered glass plate bent 1 inch (2.5 cm) from the horizontal into concave form was provided which was intended to form the outer pane of an automobile side window bilayer glazing panel. Such glass layer was manually worked down into the cloth surface of the bead bag to displace the slidably engaging surfaces of the underlying glass beads and form a self-sustaining concavity with its surface supportingly engaging one entire side of the glass pane. A polyethylene terephthalate film cover was placed over the border of the cloth bag outward of the periphery of the glass pane to avoid the lowermost polyvinyl butyral layer of the collection of plastic layers to form the shaped laminate sticking to the bag surface. The various shaping steps described in the previously noted copending application were then carried out to form the shaped laminate containing the glass layer as a rigid member thereof. The glass layer of the finished part was undamaged.

A different glass plate for a different shaped window was then worked into the same canvas bead bag surface to transform it into a mold support surface for an alternate form of shaped laminate. After carrying out the forming cycle as stated in the prior application, the glass layer of the finished part was likewise undamaged.

The preceding description is for illustration only and is not to be taken in a limited sense. Various modifications and alterations will be readily suggested to persons skilled in the art. It is intended, therefore, that the foregoing be considered as exemplary only and that the scope of the invention be ascertained from the following claims.

I claim:

1. In a mold for producing a shaped laminate having a rigid member which comprises a cavity through which plastic layers are drawn in forming the laminate, the improvement wherein said cavity comprises a deformable wall portion having a shape-sustaining configuration matching the surface contour of a rigid member of the laminate; said deformable wall portion formed of a viscous liquid or a multitude of glass beads confined within a partially filled bag loosely resting under its own weight on a surface of the mold; said deformable wall portion being reshapable by manual pressure to another shape-sustaining configuration matching the surface contour of an alternative shape of rigid member of a different shaped laminate.

* * * * *